(12) United States Patent
Eckman et al.

(10) Patent No.: US 11,157,924 B2
(45) Date of Patent: Oct. 26, 2021

(54) SYSTEM AND METHOD FOR CUSTOMER JOURNEY ANALYTICS IN E-COMMERCE AND DIGITAL MARKETING

(71) Applicant: BLUE GREEN BRANDS, LLC, Cambridge, MA (US)

(72) Inventors: Jeffrey M. Eckman, Cambridge, MA (US); Deborah A. Eckman, Cambridge, MA (US); Ryan R. Cormier, Cambridge, MA (US); Michael A. Del Muro, Cambridge, MA (US); Jonathan D. Greenfield, Cambridge, MA (US)

(73) Assignee: BLUE GREEN BRANDS, LLC, Cambridge, MA (US)

( * ) Notice: Subject to any disclaimer, the term of this patent is extended or adjusted under 35 U.S.C. 154(b) by 158 days.

(21) Appl. No.: 16/280,692

(22) Filed: Feb. 20, 2019

(65) Prior Publication Data

US 2019/0266621 A1   Aug. 29, 2019

Related U.S. Application Data

(60) Provisional application No. 62/634,319, filed on Feb. 23, 2018.

(51) Int. Cl.
  *G06Q 30/02*     (2012.01)
  *G06F 3/0483*    (2013.01)
  (Continued)

(52) U.S. Cl.
  CPC ....... *G06Q 30/0201* (2013.01); *G06F 3/0483* (2013.01); *G06F 16/583* (2019.01);
  (Continued)

(58) Field of Classification Search
  None
  See application file for complete search history.

(56) References Cited

U.S. PATENT DOCUMENTS

2012/0159356 A1*   6/2012   Steelberg ............... G06Q 50/01
                                                          715/760
2013/0055137 A1*   2/2013   Choc ..................... G06Q 30/02
                                                          715/772

(Continued)

OTHER PUBLICATIONS

Waisberg et al. "Web Analytics 2.0: Empowering Customer Centricity." SEMJ.org, vol. 2, No. 1, 2009. (Year: 2009).*

*Primary Examiner* — Susanna M. Diaz
(74) *Attorney, Agent, or Firm* — AKC Patents, LLC; Aliki K. Collins

(57) ABSTRACT

A system for providing a visual display of a visitor's journey pathways through various digital touchpoints and quantitative measurements of the visitor's interaction with each digital touchpoint includes an online visitor meta-data database, an online images database, a visitor journey analytics code, a visitor journey analytics engine, a computing system, and a user interface. The visitor journey analytics code is embedded in each digital touchpoint and the visitor journey analytics code extracts visitor meta-data associated with each digital touchpoint that a visitor visits and uploads them to the online visitor meta-data database. The visitor journey analytics engine includes a customer journey analytics processing software product that receives visitor meta-data and specific online images for each digital touchpoint a visitor visits, calculates a visitor experience performance index for each digital touchpoint, and records visitor's journey pathways through various digital touchpoints. The user interface displays the visitor's journey pathways (Continued)

through the various digital touchpoints and the calculated visitor experience performance indexes for each digital touchpoint.

17 Claims, 9 Drawing Sheets

(51) Int. Cl.
    *G06F 16/583*     (2019.01)
    *G06F 16/951*     (2019.01)
    *G06F 16/907*     (2019.01)
    *G06F 16/954*     (2019.01)

(52) U.S. Cl.
    CPC .......... *G06F 16/907* (2019.01); *G06F 16/951* (2019.01); *G06F 16/954* (2019.01)

(56) References Cited

U.S. PATENT DOCUMENTS

| | | | |
|---|---|---|---|
| 2014/0040011 A1* | 2/2014 | Kim | G06Q 30/0242 705/14.43 |
| 2015/0052503 A1* | 2/2015 | Ligman | G06F 11/3664 717/125 |
| 2015/0161652 A1* | 6/2015 | Schnabl | G06Q 30/0243 705/14.41 |
| 2015/0163311 A1* | 6/2015 | Heath | G06Q 30/0236 709/204 |
| 2016/0210656 A1* | 7/2016 | Chittilappilly | G06Q 30/0246 |
| 2017/0372350 A1* | 12/2017 | Duggal | G06Q 30/0244 |
| 2019/0065587 A1* | 2/2019 | Lin | G06F 16/958 |

\* cited by examiner

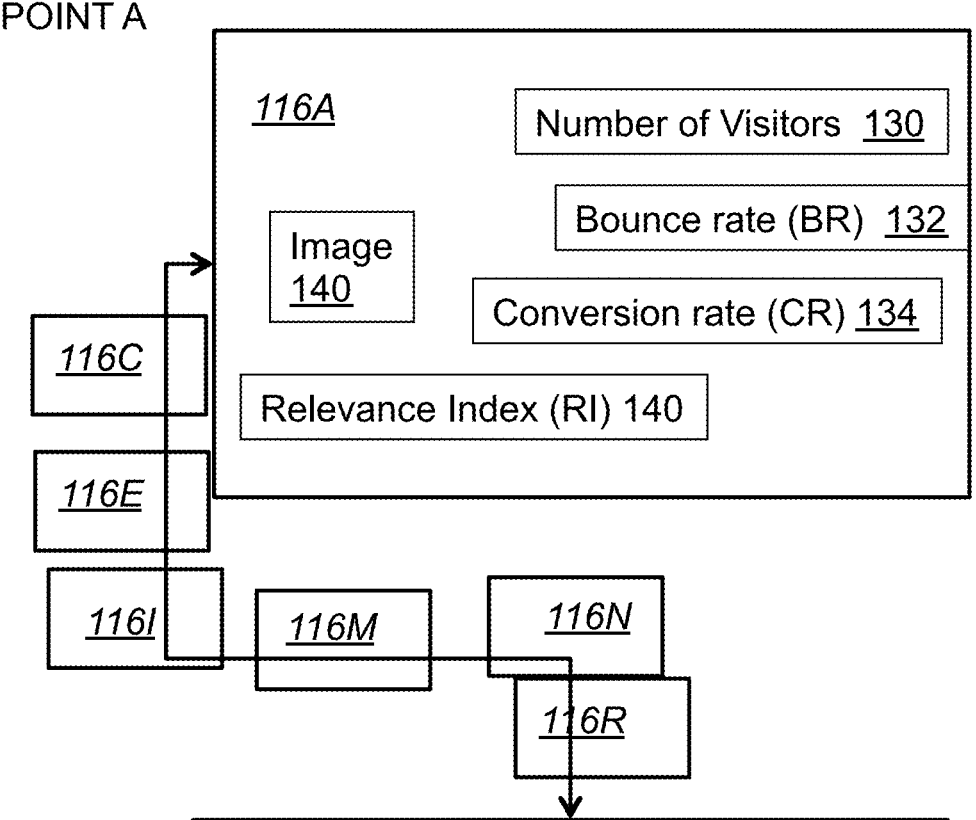
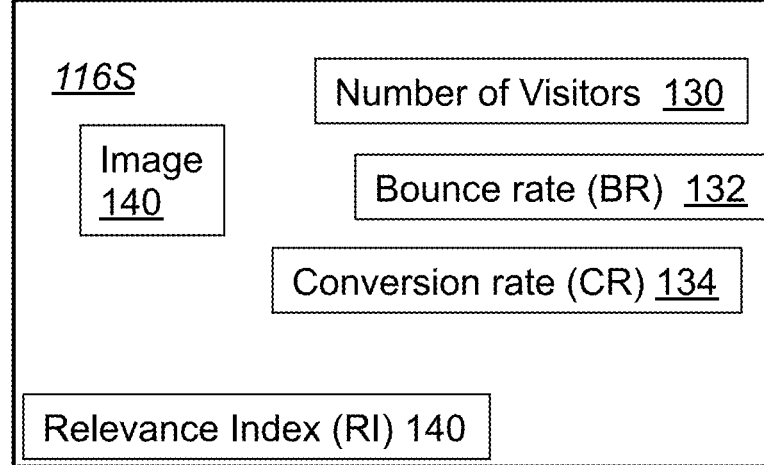
FIG. 3

$$RI = \frac{\left(\left(10 - 10 \times \left(\frac{BounceRate \times UniqueVisitors}{UniqueVisitorsAtPointA}\right)\right) + \left((1 - BounceRate) \times 10\right) + \left(ConversionRate \times 10\right)\right)}{(3)}$$

Dropoff Index: This index considers the number of unique visitors that bounce relative to the total number of unique visitors that saw the flow of a unique visitor at Point A.

Engagement Index: This index considers the engagement rate or the percent of unique visitors that take a next step/action (i.e. the inverse of the bounce rate).

Conversion Index: This index considers the conversion rate (i.e. the percent of unique visitors that enter the engagement point and also reach the conversion point, Point B).

FIG. 5

$$RIW = \frac{\left(\overbrace{\left(10 - 10 \times \left(\frac{BounceRate \times UniqueVisitors}{UniqueVisitorsAtPointA}\right)\right) \times (10 - WeightOfDropoff)}^{\text{Dropoff Index}}\right) + \left(\overbrace{(1 - BounceRate) \times 10 \times WeightOfEngagement}^{\text{Engagement Index}}\right) + \left(\overbrace{ConversionRate \times 10 \times WeightOfConversion}^{\text{Conversion Index}}\right)}{(10 - WeightOfDropoff) + WeightOfEngagement + WeightOfConversion}$$

Dropoff Index: This index considers the number of unique visitors that bounce relative to the total number of unique visitors that make the flow (i.e. unique visitors of Point A).

Engagement Index: This index considers the engagement rate of the percent of unique visitors that take a next step/action (i.e. the inverse of the bounce rate).

Conversion Index: This index considers the conversion rate (i.e. the percent of unique visitors that sets the engagement point, and reach the conversion point, Point B).

FIG. 6

SYSTEM AND METHOD FOR CUSTOMER JOURNEY ANALYTICS IN E-COMMERCE AND DIGITAL MARKETING

CROSS REFERENCE TO RELATED APPLICATIONS

This application claims the benefit of U.S. provisional application Ser. No. 62/634,319 filed on Feb. 23, 2018 and entitled SYSTEM AND METHOD FOR CUSTOMER JOURNEY ANALYTICS IN E-COMMERCE AND DIGITAL MARKETING, which is commonly assigned and the contents of which are expressly incorporated herein by reference.

FIELD OF THE INVENTION

The present invention relates to a system and a method for customer journey analytics in e-commerce, web, and screen-based interactive digital marketing, and more particularly, to customer journey analytics that provides a visual display of a customer's path through various webpages/digital touchpoints and quantitative measurements of the customer's interaction with each webpage or digital touchpoint.

BACKGROUND OF THE INVENTION

Companies and organizations use various customer acquisition management systems, tools, and methodologies for managing new customer prospects and inquiries that are generated by a variety of marketing techniques. The goal of these management systems is to acquire new customers and to persuade these customers to complete a commercial transaction, i.e., to purchase the company's products and/or services and/or to interact in some way (e.g. download a white paper, view a video, start a free trial, schedule a meeting or call with sales, among others). In e-commerce, companies and organizations use electronic online applications (websites) to present information, product, and service offerings to potential customers and to complete the commercial transactions electronically on the Internet. A typical online customer journey involves searching for a specific product online and landing on a webpage of a company's website that presents the specific product offering. The online process of product identification and purchase includes several steps from a starting webpage or digital touchpoint through several intermediate webpages to a final webpage or digital touchpoint or destination where the transaction is completed. In many cases this online customer journey process is interrupted and/or remains incomplete. For decades in the digital world, organizations have experienced significant loss in marketing funnels to a degree of up to 99% loss. So far, the tools that organizations have used to attempt to understand and mitigate the loss in the funnel have been insufficient in both the complexity of the tools, their lack of ease of use, their lack of analytics relevant to multi-step-relative customer experience performance, and in how they use visual components in the display of metrics and customer journey flows.

It would be desirable to identify the webpages or other digital touchpoints where the customer journey process is usually interrupted and to assess the efficacy of a webpage or digital touchpoint in persuading the online customer to move to the next webpage or digital touchpoint and to complete the purchasing transaction or some other customer interaction.

SUMMARY OF THE INVENTION

The invention provides a system and a method for customer journey analytics in e-commerce, web, and screen-based interactive marketing, and more particularly, to customer journey analytics that provides a visual display of a customer's path through various webpages and quantitative measurements of the customer's interaction with each webpage or digital touchpoint.

In general, in one aspect the invention provides a system for providing a visual display of a visitor's journey pathways through various digital touchpoints and quantitative measurements of the visitor's interaction with each digital touchpoint. The system includes an online visitor meta-data database, an online images database, a visitor journey analytics code, a visitor journey analytics engine, a computing system, and a user interface. The visitor journey analytics code is embedded in each digital touchpoint and the visitor journey analytics code extracts visitor meta-data associated with each digital touchpoint that a visitor visits and uploads them to the online visitor meta-data database.

The visitor journey analytics engine includes a customer journey analytics processing software product that receives visitor meta-data and specific online images for each digital touchpoint a visitor visits, calculates a visitor experience performance index for each digital touchpoint, and records visitor's journey pathways through various digital touchpoints. The computing system includes at least a processor configured to execute computer-implemented instructions of the customer journey analytics processing software product and to host the visitor meta-data database and the online-images database. The user interface displays the visitor's journey pathways through the various digital touchpoints and the calculated visitor experience performance indexes for each digital touchpoint.

Implementations of this aspect of the invention include the following. The digital touchpoints include a standard webpage, a mobile webpage, a web application, a search engine optimization (SEO) application, and a social media application. The online visitor meta-data database includes for each digital touchpoint number of visits, time spent, referring digital touchpoint, and next digital touchpoint visited by a visitor. The visitor journey analytics code captures and extracts images associated with each digital touchpoint that the visitor visits and uploads them to the online image database. The customer journey analytics processing software product further calculates optimized visitor's journey pathways that yield increased conversion rates and displays the optimized visitor's journey pathways on the user interface. The customer journey analytics processing software product further identifies segments of visitor's journey pathways that yield decreased conversion rates and result in losing value. Each visitor's journey pathway has a start digital touchpoint, an end digital touchpoint, and a plurality of intermediate digital touchpoints that the visitor visits between the start digital touchpoint and the end digital touchpoint. Each visitor's journey pathway is displayed on the fly. Each digital touchpoint includes one or more images associated with the digital point and metrics comprising one of number of visitors, bounce rate, and conversion rate. Each visitor is identified by a web cookie. The customer journey analytics processing software product calculates the visitor experience performance index for each digital touchpoint using:

$$RI = \frac{\left(10 - 10 \times \left(\frac{\text{Bounce Rate} \times \text{Unique Visitors}}{\text{Unique Visitors at Starting Point}}\right)\right) + ((1 - \text{Bounce Rate}) \times 10) + (\text{Conversion Rate} \times 10)}{3}$$

The system further includes a machine learning (ML) and artificial intelligence (AI) engine and the ML and AI engine uses large volumes of data to recognize patterns of behavior and to inform and update the customer journey analytics processing software product.

In general, in another aspect the invention provides a method for visually displaying a visitor's journey pathways through various digital touchpoints and quantitative measurements of the visitor's interaction with each digital touchpoint. The method includes providing an online visitor meta-data database, providing an online images database, embedding a visitor journey analytics code in each digital touchpoint, providing a visitor journey analytics engine, providing a computing system, and providing a user interface. The visitor journey analytics code extracts visitor meta-data associated with each digital touchpoint that a visitor visits and uploads them to the online visitor meta-data database. The visitor journey analytics engine includes a customer journey analytics processing software product that receives visitor meta-data and specific online images for each digital touchpoint a visitor visits, calculates a visitor experience performance index for each digital touchpoint, and records visitor's journey pathways through various digital touchpoints. The computing system includes at least a processor configured to execute computer-implemented instructions of the customer journey analytics processing software product and to host the visitor meta-data database and the online-images database. The user interface displays the visitor's journey pathways through the various digital touchpoints and the calculated visitor experience performance indexes for each digital touchpoint.

The details of one or more embodiments of the invention are set forth in the accompanying drawings and description below. Other features, objects, and advantages of the invention will be apparent from the following description of the preferred embodiments, the drawings and from the claims.

BRIEF DESCRIPTION OF THE DRAWINGS

Referring to the figures, wherein like numerals represent like parts throughout the several views:

FIG. 3 is a schematic diagram depicting quantitative measurements of the customer's interaction with a start-webpage/touchpoint and an end-webpage/touchpoint;

FIG. 5 depicts a relevance index equation used for measuring a customer's interaction with a webpage or digital touchpoint, according to this invention;

FIG. 6 depicts a weighted relevance index equation used for providing a weighted quantitative measurement of the customer's interaction with a webpage or digital touchpoint, according to this invention;

DETAILED DESCRIPTION OF THE INVENTION

The invention provides a system and a method for customer journey analytics in e-commerce, web, and screen-based interactive marketing, and more particularly, to customer journey analytics that provides a visual display of a customer's path through various webpages and quantitative measurements of the customer's interaction with each webpage or digital touchpoint.

Figure 1:
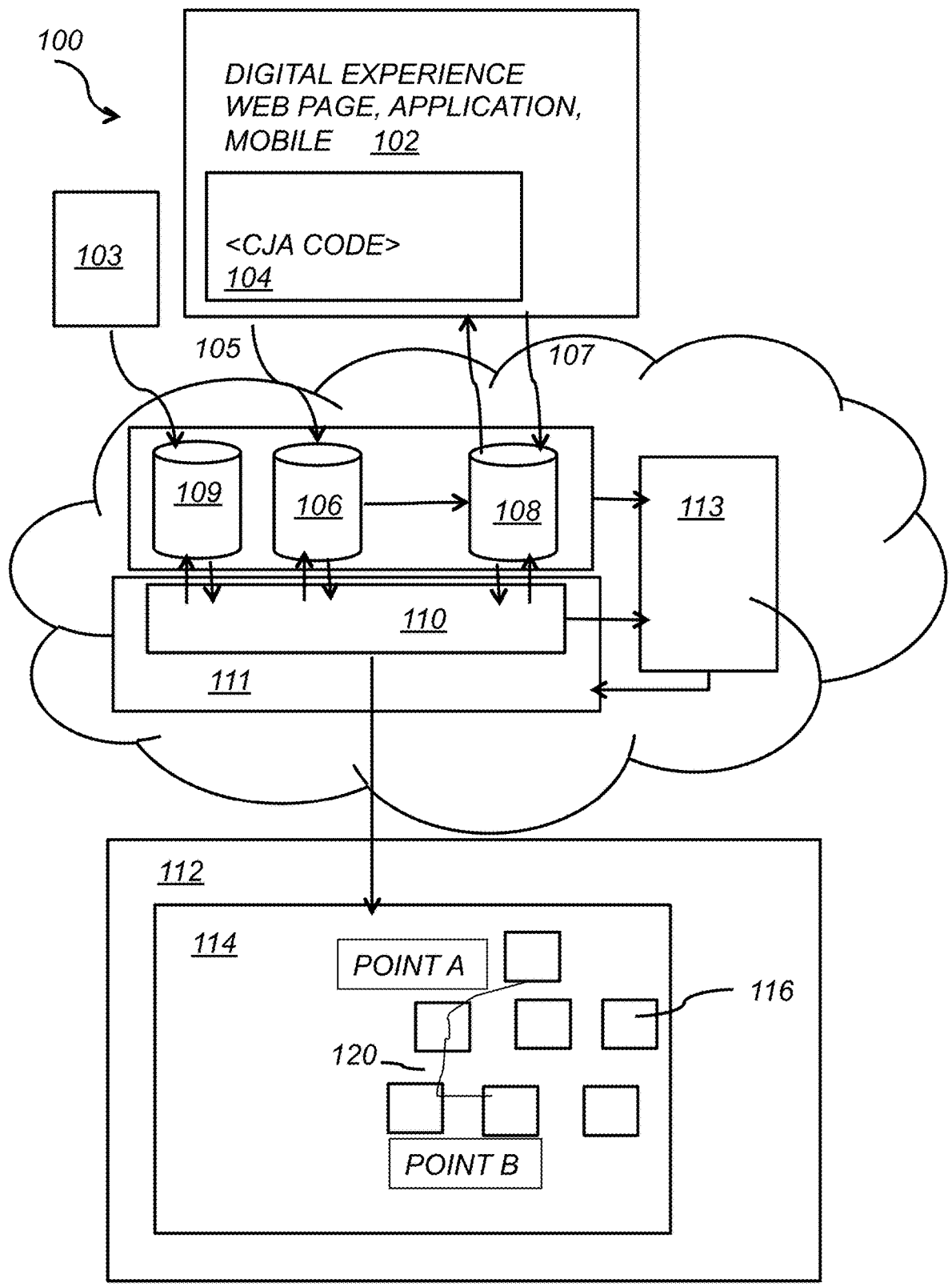
FIG. 1 is a diagrammatic view of a customer journey analytics system according to this invention.

Referring to FIG. 1, customer journey analytics system 100 according to this invention includes a customer journey analytics (CJA) code 104 that is embedded in each webpage, web application, or mobile application 102. CJA code 104 extracts visitor meta-data 105 associated with each webpage or digital touchpoint 102 that the customer visits and uploads them to an online visitor meta-data database 106. The visitor meta-data 105 include number of visits for a webpage or digital touchpoint, time spent on a webpage, referring site, and next webpage or digital touchpoint the customer visited, among others.

CJA code 104 also captures and extracts images/screenshots 107 associated with each webpage, digital touchpoint, or screen 102 that the customer visits and uploads them to an online image database 108. The visitor meta-data 105 and the images 107 are entered into a customer journey analytics (CJA) engine 111 that runs a customer journey analytics processing software product 110. Processing software 110 ties the specific visitor meta-data 105 to specific images 107 and calculates a multi-step customer experience performance index or webpage/touchpoint relevance index (RI) using the equation of FIG. 5, as will be described below. In some embodiments, third party data 103 generated by other application programming interfaces (APIs) and third party analytics engines are also entered into the CJA engine 111 and processed by CJA software 110. The CJA software product 110 addresses the key problem of a lack of understanding of the aspects of digital customer journey flows that contribute to lost opportunity for organizations that use various marketing tactics for customer acquisition and engagement. The CJA software 110 identifies segments of a customer journey that are losing value, where exponential growth could be gained by applying the software's recommendation. Next, the CJA software 110 displays customer journey pathways 120 or funnels through the various webpages/touchpoints 116 on the user interface 112 of the application. The customer journey pathways 120 are displayed on the fly, based on the user's choice of a starting point (point A) and an endpoint (point B). Point B may be a conversion point, success page or goal point. Each point 116 represents the customer's digital experience at a specific webpage and includes images 107 and meta-data 105.

Customer journey analytics system 100 also includes a machine learning (ML) and artificial intelligence (AI) engine 113. The visitor meta-data 106, image database 108, and the output of the CJA software 110 are also entered into the machine learning (ML) and artificial intelligence (AI) engine 113. The ML and AI engine 113 uses large volumes of data collected to recognize patterns of behavior and to inform and update the CJA software product 110. Patterns of customer interaction are used in conjunction with the relevance index algorithm to enhance the identification of optimization opportunities provided by the CJA software product 110 and the CJA engine 111. The resultant product of the CJA engine 111 and the CJA software product 110 are then, in turn, fed back into the ML and AI engine 113, forming a continuous feedback loop that increases the accuracy, relevance, and value of relevance index, and thus the quality of the recommendations provided to the user of the software.

Figure 2:
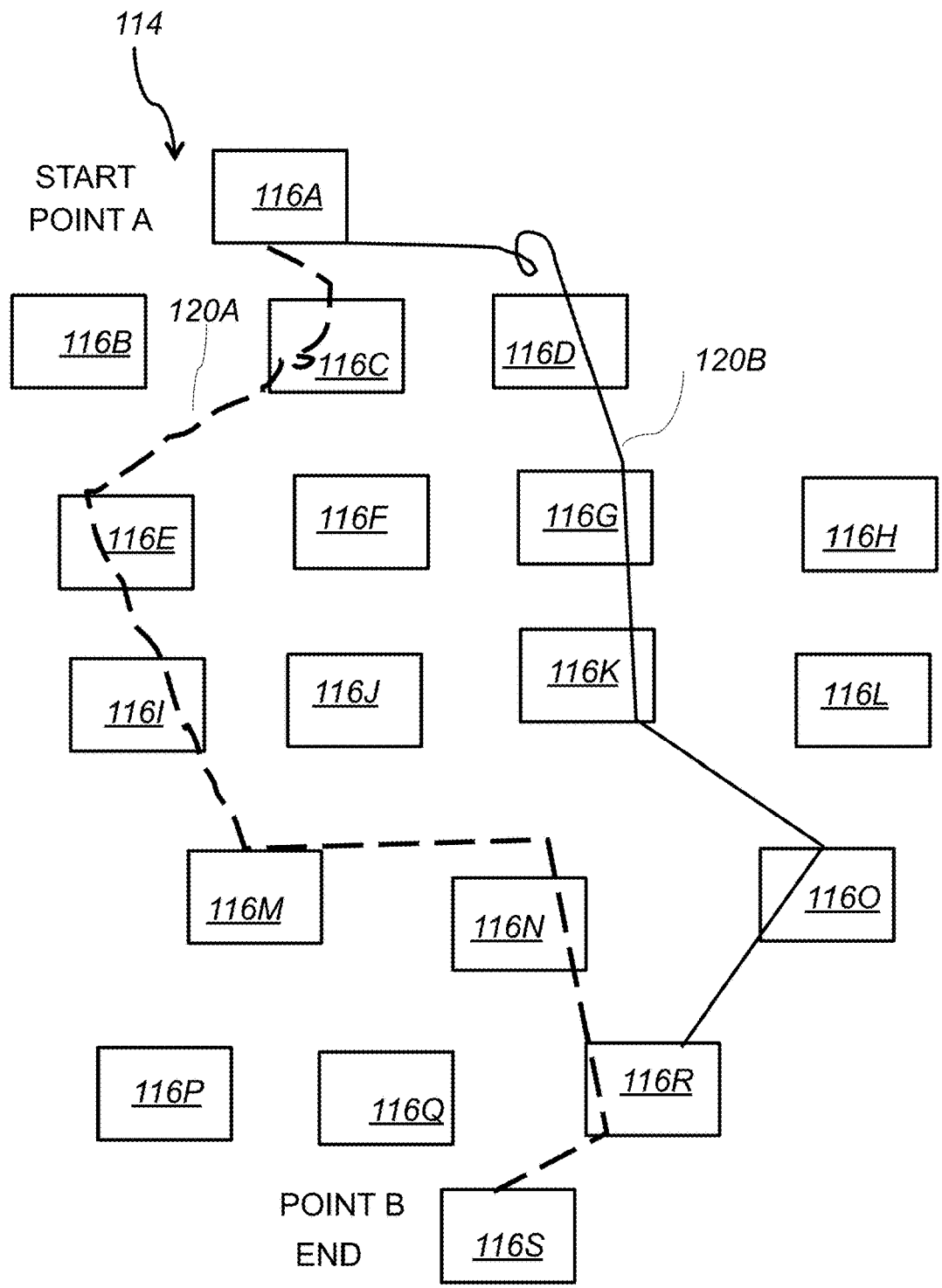
FIG. 2 is a schematic diagram of a visual representation of a customer's journeys through a series of webpages or digital touchpoints according to this invention.

Referring to FIG. 2, a typical customer journey visual representation 114 includes webpages/points 116A-116S for each website and pathways 120A that a customer takes from a starting point 116A (point A) to an end point 116S (point B). The customer journey representation 114 also includes recommended optimized pathways 120B that could yield increased conversion rates. Each webpage/point 116A-116S includes an image/screenshot 140 associated with the visited webpage/point and metrics including number of visitors 130, bounce rate 132, and conversion rate 134, among others, as shown in FIG. 3.

The number of visitors arriving at each point 116A-116S refers to the number of unique visitors (UV) that arrive at each point of the website or digital experience. Each visitor is identified by a web cookie, which is a small piece of data sent by the website and stored in the visitor's computer by the visitor's web browser while the visitor is browsing. A point or touchpoint is a webpage or other digital place where a visitor lands and is presented with some content and options for taking actions. The number of visitors (as identified by a web cookie) that take another action on a given point A within a certain time interval after arriving at the given point A is the number of engaged unique visitor (EUV). The ratio of the engaged unique visitors versus the number of unique visitors is the engagement rate (ER) at the given point A. The inverse of the engagement rate is the bounce rate (BR) that represents the number of unique visitors that do not take any action on the given point A within a certain time interval after arriving at the given point A. The number of unique visitors that complete a marketer-defined action or goal (i.e., reach point B within a certain amount of time Z after arriving at point A) defines the unique visitor conversions and the percent of unique visitor conversions defines the conversion rate.

At each point 116A-116S a relevance index (RI) 140 is calculated using the equation of FIG. 5. The relevance index (RI) assigns a relative rating of each point based on scale of 0-10. The relevance index (RI) is the sum of the dropoff index (DI), engagement index (EI), and conversion index (CI), divided by three. The dropoff index (DI) considers the number of unique visitors that bounce relative to the total number of unique visitors that enter the flow at point A. The engagement index (EI) considers the engagement rate or the percent of unique visitors that take a next step/action (i.e., inverse of bounce rate).

The conversion index (CI) considers the conversion rate (i.e. the percent of unique visitors that enter the point in question and reach the conversion point B).

An example of a customer journey representation is described with reference to FIG. 4. Company "ABC Toys" is spending a significant portion of their marketing budget on driving traffic to their website and landing pages. ABC Toys' marketing team successfully drove 10,000 visitors (in a 1 week time period) to a landing page that they built to increase sales for two product categories including toy cars and action figures. The 10,000 visitors ended up on the first page 116A in the flow (i.e. 'Point A'). At Point A, the 10,000 visitors were asked, "Which do you like the most?" and were presented with two choices: 'Toy Cars' or 'Action Figures'. In total, 500 chose 'Toy Cars', 3000 chose 'Action Figures', and 6500 visitors bounced (i.e. left the page or did not answer). This results in a bounce rate of 65% for Point A at 116A.

The visitors who chose 'Toy Cars' were brought to a second page 116B that asked, "What kind of toy car do you like?" and were presented with two choices for toy cars: 'Fast Ones' or 'Construction'. Of the 500 visitors that landed on this page, 175 chose 'Fast Ones,' 300 chose 'Construction' and 25 bounced. This results in a bounce rate of 5% for this page 116B. The 175 visitors who chose 'Fast Ones' were brought to a third page 116E with a picture of a toy sports car and the option to purchase the toy. In total, 15 of those visitors made the purchase and subsequently arrived on the 'thank you' page 116K, (i.e. Point B), while the remaining 160 visitors bounced—resulting in a bounce rate of 91.4%. The 300 visitors who chose 'Construction' were brought to a third page 116F with a picture of a toy bulldozer and the option to purchase the toy. In total, 35 of those visitors made the purchase and subsequently arrived on the 'thank you' page 116L, (i.e. Point B), while the remaining 265 visitors bounced—resulting in a bounce rate of 88.3%.

Going back to up Point A at 116A, the 3,000 visitors who chose 'Action Figures,' were brought to a second page 116C where they were presented with three choices of characters: 'Jeff,' 'Zoee' or 'Ryan.' In total, 1490 bounced, 10 selected 'Jeff,' 1,000 selected 'Zoee' and 500 selected 'Ryan.' The bounce rate for this page is 49.7%. The visitors were then brought, respectively, to the purchase pages for 'Jeff' 116D, 'Zoee' 116G, and 'Ryan' 116H. Of the 10 visitors who selected 'Jeff,' 5 made the purchase and ended up on the 'thank you' page 116S, (i.e. Point B), while the remaining 5 visitors bounced, resulting in a bounce rate of 50%. Of the 1,000 visitors who selected 'Zoee,' 800 made the purchase and ended up on the 'thank you' page 116I, (i.e. Point B), while the remaining 200 visitors bounced, resulting in a bounce rate of 20%. Of the 500 visitors who selected 'Ryan,' 10 made the purchase and ended up on the 'thank you' page 116G, (i.e. Point B), while the remaining 490 bounced, resulting in a bounce rate of 98%.

Figure 4:
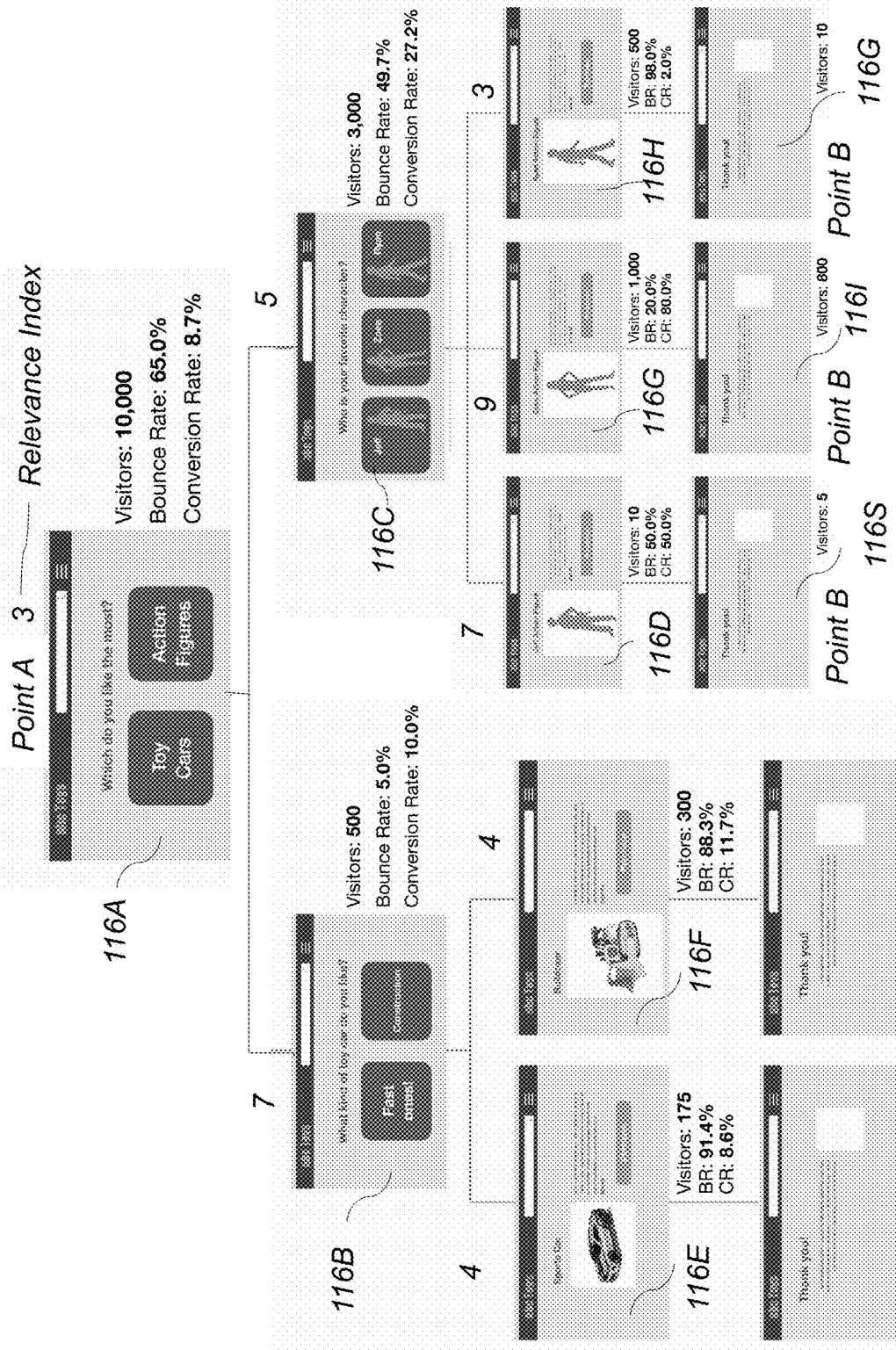
FIG. 4 depicts an example of applying the customer journey analytics of FIG. 1 to the webpages of an e-commerce website.

Conversion rates are calculated for each page 116A-116L of FIG. 4. Conversion rates are defined as the percent of visitors who arrived on a given page that eventually arrived at 'Point B'. For example, the page 116B that offers 'Fast Ones' or 'Construction' for toy car types has a conversion rate of 10% because of the 500 visitors that visited that page, 50 ultimately made it to 'Point B' (15 via sports car purchase and 35 via bulldozer purchase). We can use the information in the customer journey example for performance analysis and enhancement. By examining bounce and conversion rates at the top of the experience (Point A) and at each step in the customer journey, we can assess the absolute and relative efficacy of the entire experience and at each step in the customer journey. For example, providing the two choices for toy cars (Fast Ones' or 'Construction') performed better than the 'Character' choices under Action Figures when it came to bounce rate, but worse when it came to conversion rate. Similarly, the Zoee Action Figure significantly outperformed all other toys offered. Additionally, we could say that it would be advisable to improve the character choice page 116C under Action Figures given its high bounce rate (49.7%) relative to its peer 'Fast Ones' or 'Construction' choice page 116B (5%).

Customer Journey Example (w/Relevance Index)

The relevance index (RI) is a metric that gives each page in a flow a score from 0-10 that is representative of the performance of that page relative to the rest of the flow. A relevance index score of 0 means the page is performing very poorly, while a score of 10 means the page is performing extremely well. As was mentioned above, the relevance index is a function of the drop-off (i.e. number of visitors that bounce) relative to the total number of visitors that entered at 'Point A,' the engagement rate (i.e. inverse of the bounce rate), and the percent of visitors that ultimately convert (i.e. make it to 'Point B'). The RI allows users of the CJA software to quickly and easily identify opportunities for optimization within their customer journeys. Whether the user is an expert in web analytics or has little to no understanding of the matter, the relevance index bridges the gap between data capture and impactful optimization by analyzing the data and providing actionable insights in real-time. The relevance index helps people and companies make more impactful decisions in just moments, without data expertise, ultimately saving time and money, as well as providing insights that can be used for generating exponential growth in marketing ROI.

A weighted relevance index (MW) is calculated using the equation of FIG. 6. A weighting system is incorporated into the relevance index equation for the purpose of fine-tuning the impact that each element of the equation (drop-off, engagement rate, and conversion rate) has on the final score. The weights are in the range of 1-9. By increasing the weight of the drop-off, the importance of the number of visitors that drop-off is increased (relative to the other two elements of the equation). This also increases the standard deviation, variance, and range of all the relevance index scores in the flow. By increasing the weight of the engagement rate, the importance of the percent of visitors that are taking the next step (i.e. getting to the next page) is increased (relative to the other two elements of the equation). This also increases the standard deviation, variance, and range of all the relevance index scores in the flow. By increasing the weight of the conversion rate, the importance of the number of visitors from any given page that ultimately reach 'Point B' is increased (relative to the other two elements of the equation). This also increases the standard deviation, variance, and range of all the relevance index scores in the flow. The default weightings for the drop-off, engagement rate, and conversion rate are X, Y, and Z, respectively. In one example, X=4, Y=7, Z=5. However, different weighting may be necessary for different situations, flows, and/or clients. For instance, a company that is relying fully on organic media to drive traffic (i.e. not paying for clicks into a flow) to drive sales of a very niche product is going to be more concerned with conversion rates than engagement or drop-off—thus, the company would increase the weighting of the conversion rates relative to the other two elements. Within a single company, different departments (and even different roles within a department) may be interested in seeing the same flows with different weighting. A chief financial officer may be interested gaining a better understanding for drop-off and conversion rates, while a marketing manager may be more interested drop-off and engagement, and a head of sales may be more interested in conversion rates.

Figure 7:
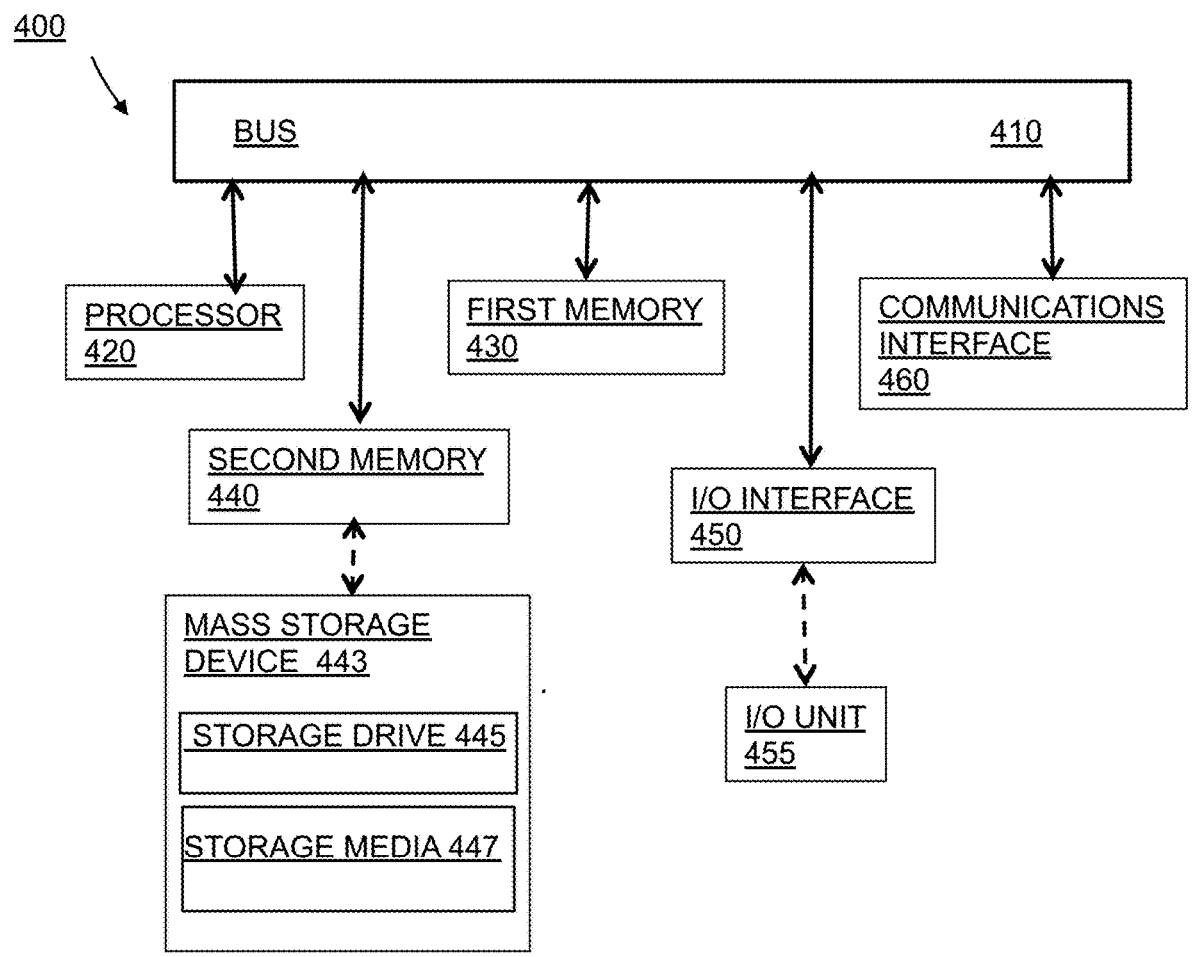
FIG. 7 depicts a computer system used for running the applications and methods of this invention.

Referring to FIG. 7, an exemplary computer system 400 or network architecture that may be used to implement the system of the present invention includes a processor 420, first memory 430, second memory 440, I/O interface 450 and communications interface 460. All these computer components are connected via a bus 410. One or more processors 420 may be used. Processor 420 may be a special-purpose or a general-purpose processor. As shown in FIG. 7, bus 410 connects the processor 420 to various other components of the computer system 400. Bus 410 may also connect processor 420 to other components (not shown) such as, sensors, and servomechanisms. Bus 410 may also connect the processor 420 to other computer systems. Processor 420 can receive computer code via the bus 410. The term "computer code" includes applications, programs, instructions, signals, and/or data, among others. Processor 420 executes the computer code and may further send the computer code via the bus 410 to other computer systems. One or more computer systems 400 may be used to carry out the computer executable instructions of this invention.

Computer system 400 may further include one or more memories, such as first memory 430 and second memory 440. First memory 430, second memory 440, or a combination thereof function as a computer usable storage medium to store and/or access computer code. The first memory 430 and second memory 440 may be random access memory (RAM), read-only memory (ROM), a mass storage device, or any combination thereof. As shown in FIG. 7, one embodiment of second memory 440 is a mass storage device 443. The mass storage device 443 includes storage drive 445 and storage media 447. Storage media 447 may or may not be removable from the storage drive 445. Mass storage devices 443 with storage media 447 that are removable, otherwise referred to as removable storage media, allow computer code to be transferred to and/or from the computer system 400. Mass storage device 443 may be a Compact Disc Read-Only Memory ("CDROM"), ZIP storage device, tape storage device, magnetic storage device, optical storage device, Micro-Electro-Mechanical Systems ("MEMS"), nanotechnological storage device, floppy storage device, hard disk device, USB drive, among others. Mass storage device 443 may also be program cartridges and cartridge interfaces, removable memory chips (such as an EPROM, or PROM) and associated sockets.

The computer system 400 may further include other means for computer code to be loaded into or removed from the computer system 400, such as the input/output ("I/O") interface 450 and/or communications interface 460. Both the I/O interface 450 and the communications interface 460 allow computer code to be transferred between the computer system 400 and external devices including other computer systems. This transfer may be bi-directional or omni-direction to or from the computer system 400. Computer code transferred by the I/O interface 450 and the communications interface 460 are typically in the form of signals, which may be electronic, electromagnetic, optical, or other signals capable of being sent and/or received by the interfaces. These signals may be transmitted via a variety of modes including wire or cable, fiber optics, a phone line, a cellular phone link, infrared ("IR"), and radio frequency ("RF") link, among others.

The I/O interface 450 may be any connection, wired or wireless, that allows the transfer of computer code. In one example, I/O interface 450 includes an analog or digital audio connection, digital video interface ("DVI"), video graphics adapter ("VGA"), musical instrument digital interface ("MIDI"), parallel connection, PS/2 connection, serial connection, universal serial bus connection ("USB"), IEEE1394 connection, PCMCIA slot and card, among others. In certain embodiments the I/O interface connects to an I/O unit 455 such as a user interface, monitor, speaker, printer, touch screen display, among others. Communications interface 460 may also be used to transfer computer code to computer system 400. Communication interfaces include a modem, network interface (such as an Ethernet card), wired or wireless systems (such as Wi-Fi, Bluetooth, and IR), local area networks, wide area networks, and intranets, among others.

The invention is also directed to computer products, otherwise referred to as computer program products, to provide software that includes computer code to the computer system 400. Processor 420 executes the computer code in order to implement the methods of the present invention. In one example, the methods according to the present invention may be implemented using software that includes the computer code that is loaded into the computer system 400 using a memory 430, 440 such as the mass storage drive 443, or through an I/O interface 450, communications interface 460, or any other interface with the computer system 400. The computer code in conjunction with the computer system 400 may perform any one of, or any combination of, the steps of any of the methods presented herein. The methods according to the present invention may be also performed automatically, or may be invoked by some form of manual intervention.

The computer system 400, or network architecture, of FIG. 7 is provided only for purposes of illustration, such that the present invention is not limited to this specific embodiment.

Figure 8:
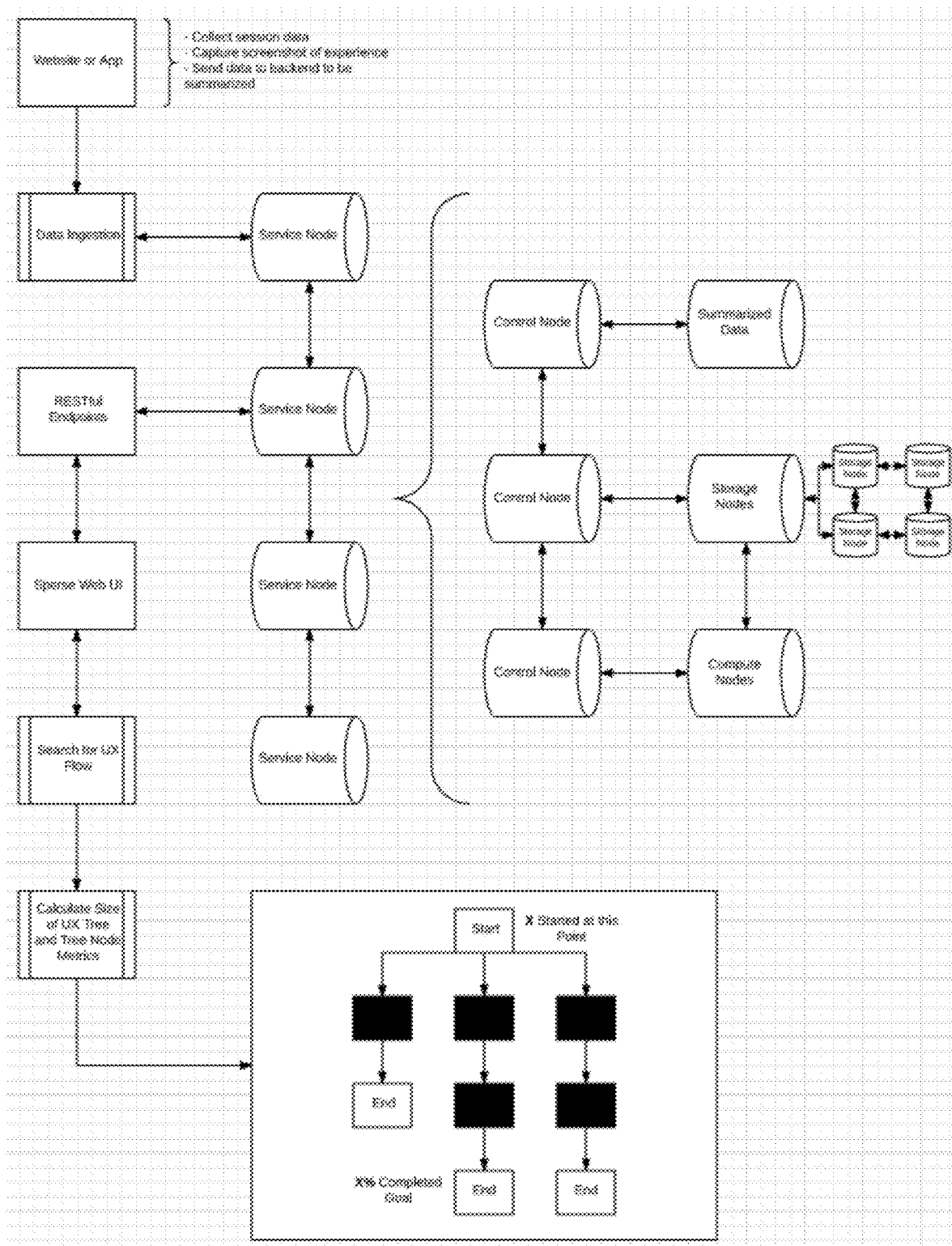
FIG. 8 depicts an example of a computing architecture for the customer journey analytics application.
Figure 9:
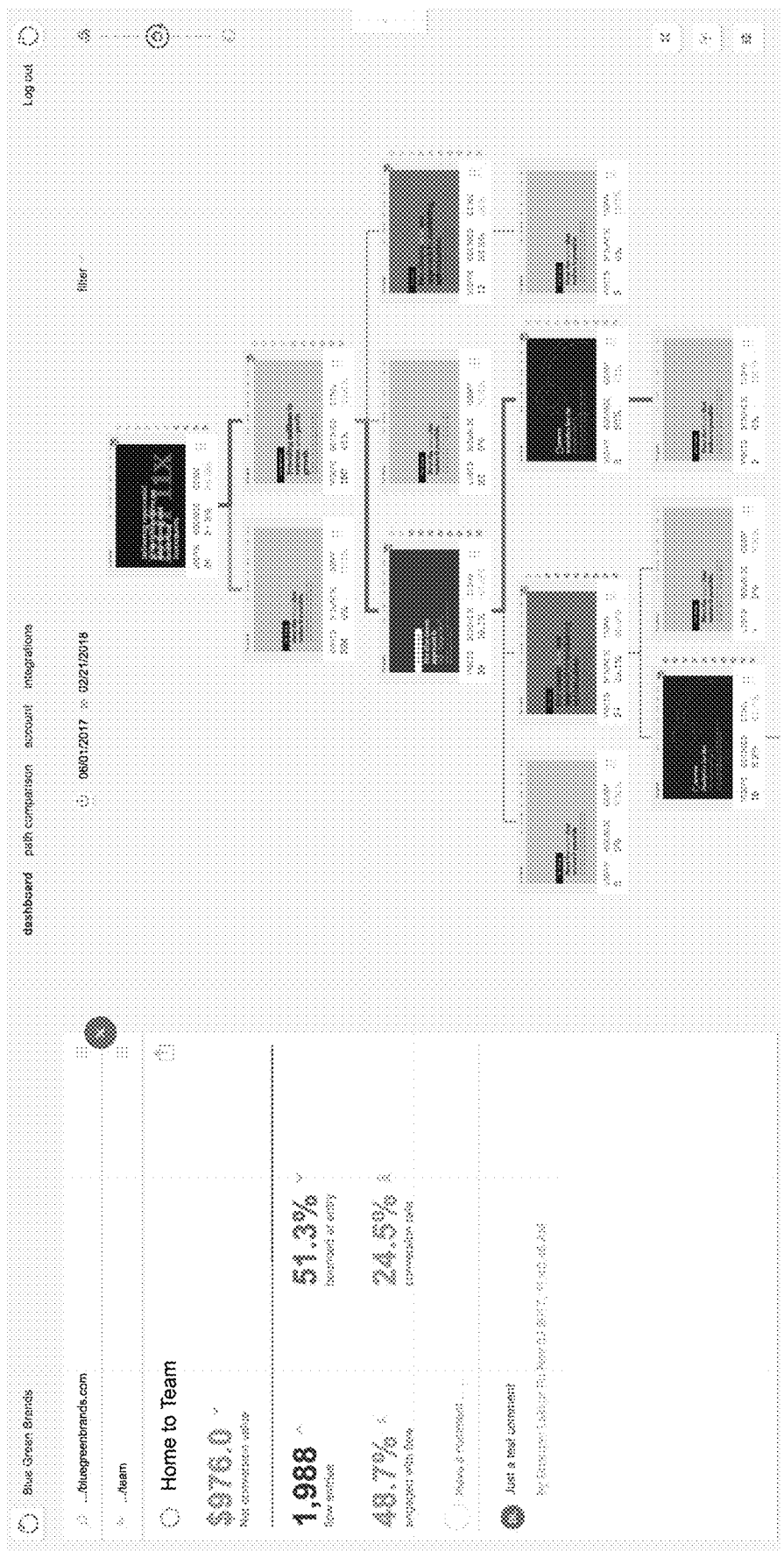
FIG. 9 depicts an example of a user interface for presenting calculation results of the customer journey analytics application.

An example of a computing architecture for running the customer journey analytics application is shown in FIG. 8. An example of a user interface for presenting a single webpage customer journal analytics results is shown in FIG. 9.

Several embodiments of the present invention have been described. Nevertheless, it will be understood that various modifications may be made without departing from the spirit and scope of the invention. Accordingly, other embodiments are within the scope of the following claims.

What is claimed is:

1. A system for providing a visual display of a visitor's journey pathways through various consecutive digital touchpoints that are interconnected and accessed via a network, and quantitative measurements of the visitor's interaction with each digital touchpoint comprising:
    a computing system configured to access the digital touchpoints via the network and comprising at least a display, a memory storing computer-executable instructions of a visitor journey analytics engine, and a processor coupled to the memory, and configured to execute the computer-executable instructions of the visitor journey analytics engine;
    an online visitor meta-data database communicatively coupled to the computing system via the network;
    an online images database communicatively coupled to the computing system via the network;
    a visitor journey analytics code that is embedded in each digital touchpoint and wherein the processor executes computer-executable instructions of the visitor journey analytics code that capture and extract specific images associated with each digital touchpoint and specific visitor meta-data associated with each digital touchpoint that a visitor visits and uploads them to the online images database and the online visitor meta-data database, respectively;
    wherein the visitor journey analytics engine comprises a customer journey analytics processing software product, wherein the visitor journey analytics engine receives the specific visitor meta-data and the specific images for each digital touchpoint the visitor visits from the online meta-data database and the online images database, respectively, and executes via the processor computer-executable instructions of the customer journey analytics processing software product that are configured to tie the specific visitor meta-data with the specific images for each digital touchpoint the visitor visits, calculate a number of unique visitors for each digital touchpoint the visitor visits, calculate bounce rate for each digital touchpoint the visitor visits, calculate conversion rate for each digital touchpoint the visitor visits, calculate a visitor experience performance index for each digital touchpoint the visitor visits, record the visitor experience performance index for each digital touchpoint the visitor visits in the memory, graphically connect the various consecutive digital touchpoints the visitor visits to form the visitor's journey pathways and display via the display the visitor's journey pathways, the calculated number of unique visitors, the calculated bounce rate, the calculated conversion rate, and the calculated visitor experience performance index at each digital touchpoint;
    a user interface that displays on the display the graphically connected consecutive digital touchpoints of the visitor's journey pathways and the calculated visitor experience performance indexes for each digital touchpoint;
    wherein the processor executes computer executable instructions of the customer journey analytics processing software product that calculate the visitor experience performance index for each digital touchpoint using:

$$RI = \frac{\left(10 - 10 \times \left(\frac{\text{(Bounce Rate} \times \text{Unique Visitors)}}{\text{Unique Visitors at Starting Point}}\right)\right) + ((1 - \text{Bounce Rate}) \times 10) + (\text{Conversion Rate} \times 10)}{3}.$$

2. The system of claim 1, wherein the digital touchpoints comprise one of a standard webpage, a mobile webpage, a web application, a search engine optimization (SEO) application, or a social media application.

3. The system of claim 1, wherein the online visitor meta-data database comprises for each digital touchpoint number of visits, time spent, referring digital touchpoint, and next digital touchpoint visited by a visitor.

4. The system of claim 1, wherein the customer journey analytics processing software product further comprises computer-executable instructions that are configured to be executed by the processor to calculate optimized visitor's journey pathways that yield increased conversion rates and to display the graphically connected digital touchpoints of the optimized visitor's journey pathways on the user interface.

5. The system of claim 1, wherein the customer journey analytics processing software product further comprises computer-executable instructions that are configured to be executed by the processor to identify segments of visitor's journey pathways that yield decreased conversion rates and result in losing value.

6. The system of claim 1, wherein each visitor's journey pathway comprises a start digital touchpoint, an end digital touchpoint, and a plurality of intermediate digital touchpoints that the visitor visits between the start digital touchpoint and the end digital touchpoint and wherein each visitor's journey pathway is graphically displayed on the fly.

7. The system of claim 1, wherein each graphically displayed digital touchpoint comprises one or more images associated with the digital point and metrics comprising one of number of visitors, bounce rate, and conversion rate.

8. The system of claim 1, wherein each visitor is identified by a web cookie.

9. The system of claim 1, wherein the computing system further comprises a machine learning (ML) and artificial intelligence (AI) engine and wherein the ML and AI engine uses large volumes of data to recognize patterns of behavior and to inform and update the customer journey analytics processing software product.

10. A method for visually displaying a visitor's journey pathways through various digital touchpoints that are interconnected and accessed via a network, and quantitative measurements of the visitor's interaction with each digital touchpoint comprising:
- accessing the digital touchpoints by a computing system via the network wherein the computing system comprises at least a display, a memory storing computer-executable instructions of a visitor journey analytics engine, and a processor coupled to the memory and configured to execute the computer-executable instructions of the visitor journey analytics engine;
- coupling communicatively an online visitor meta-data database to the computing system via the network;
- coupling communicatively an online images database to the computing system via the network;
- embedding a visitor journey analytics code in each digital touchpoint and executing computer-executable instructions of the visitor journey analytics code by the processor that captures and extracts specific images associated with each digital touchpoint and specific visitor meta-data associated with each digital touchpoint that a visitor visits and uploads them to the online images database and the online visitor meta-data database, respectively;
- wherein the visitor journey analytics engine comprises a customer journey analytics processing software product, wherein the visitor journey analytics engine receives the specific visitor meta-data and the specific online images for each digital touchpoint a visitor visits from the online meta-data database and the online images database, respectively, executes via the processor computer-executable instructions of the customer journey analytics processing software product that are configured to tie the specific visitor meta-data with the specific images for each digital touchpoint the visitor visits, calculate a visitor experience performance index for each digital touchpoint the visitor visits, record the visitor experience performance index for each digital touchpoint the visitor visits, graphically connect the various digital touchpoints the visitor visits to form the visitor's journey pathways, and display the visitor's journey pathways and the visitor experience performance index at each digital touchpoint;
- displaying graphically within a user interface the visitor's journey pathways through the various digital touchpoints and the calculated visitor experience performance indexes for each digital touchpoint;
- wherein the processor executes computer executable instructions of the customer journey analytics processing software product that calculate the visitor experience performance index for each digital touchpoint using:

$$RI = \frac{\left(10 - 10 \times \left(\frac{\text{Bounce Rate} \times \text{Unique Visitors}}{\text{Unique Visitors at Starting Point}}\right)\right) + ((1 - \text{Bounce Rate}) \times 10) + (\text{Conversion Rate} \times 10)}{3}.$$

11. The method of claim 10, wherein the digital touchpoints comprise one of a standard webpage, a mobile webpage, a web application, a search engine optimization (SEO) application, or a social media application.

12. The method of claim 10, wherein the online visitor meta-data database comprises for each digital touchpoint number of visits, time spent, referring digital touchpoint, and next digital touchpoint visited by a visitor.

13. The method of claim 10, wherein the customer journey analytics processing software product further comprises computer-executable instructions that are configured to be executed by the processor to calculate optimized visitor's journey pathways that yield increased conversion rates and graphically display the optimized visitor's journey pathways on the user interface.

14. The method of claim 10, wherein the customer journey analytics processing software product further comprises computer-executable instructions that are configured to be executed by the processor to identify segments of visitor's journey pathways that yield decreased conversion rates and result in losing value.

15. The method of claim 10, wherein each visitor's journey pathway comprises a start digital touchpoint, an end digital touchpoint, and a plurality of intermediate digital touchpoints that the visitor visits between the start digital touchpoint and the end digital touchpoint and wherein each visitor's journey pathway is graphically displayed on the fly.

16. The method of claim 10, wherein each graphically displayed digital touchpoint comprises one or more images associated with the digital point and metrics comprising one of number of visitors, bounce rate, and conversion rate.

17. The method of claim 10, wherein each visitor is identified by a web cookie.

* * * * *